Aug. 30, 1960 H. D. FOWLER 2,950,878
SLIP STREAM DEFLECTOR FOR CONVERTIBLE AIRCRAFT
Filed June 14, 1957 3 Sheets-Sheet 3
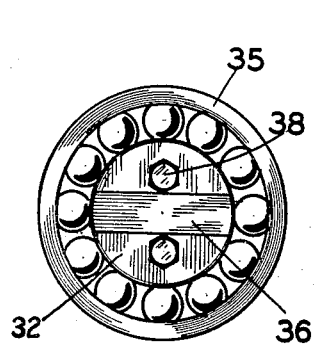
FIG. 9.
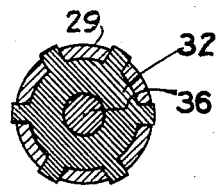
FIG. 10.
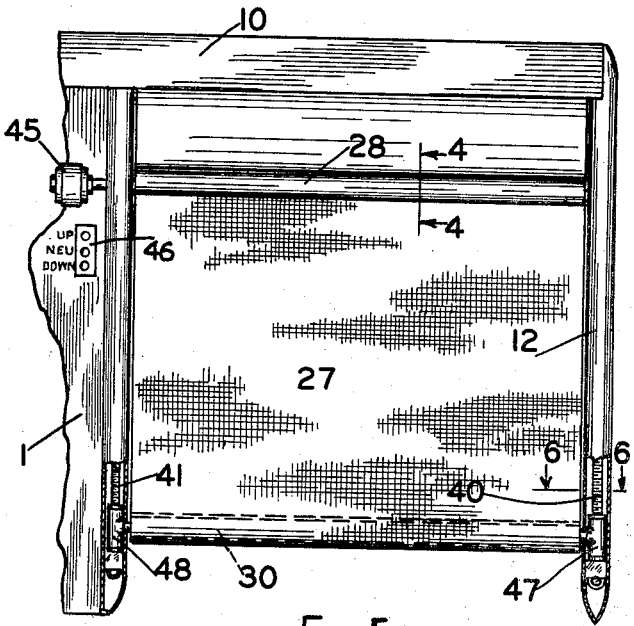
FIG. 5.
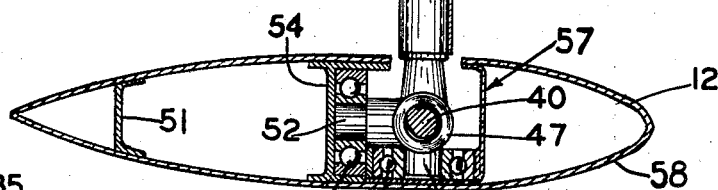
FIG. 6.
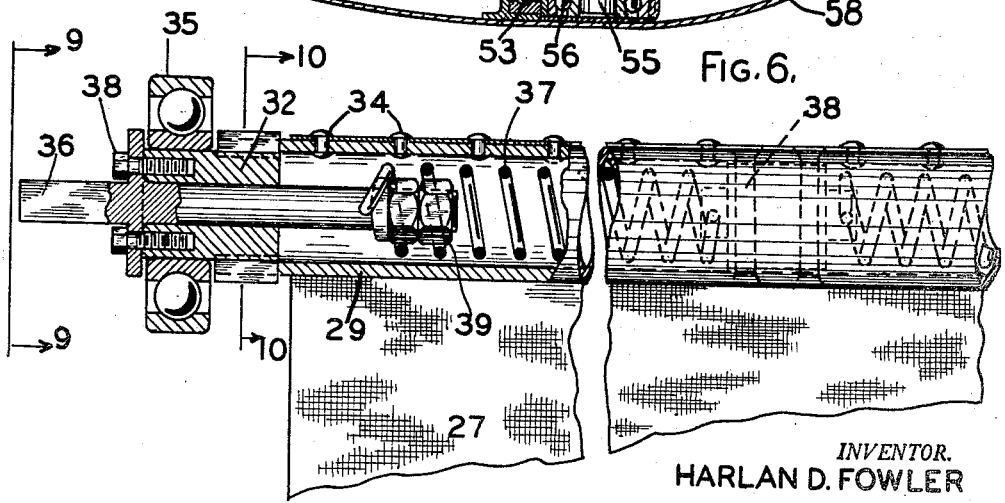
FIG. 7.
INVENTOR.
HARLAN D. FOWLER
BY
*McGrew Edwards*
ATTORNEYS

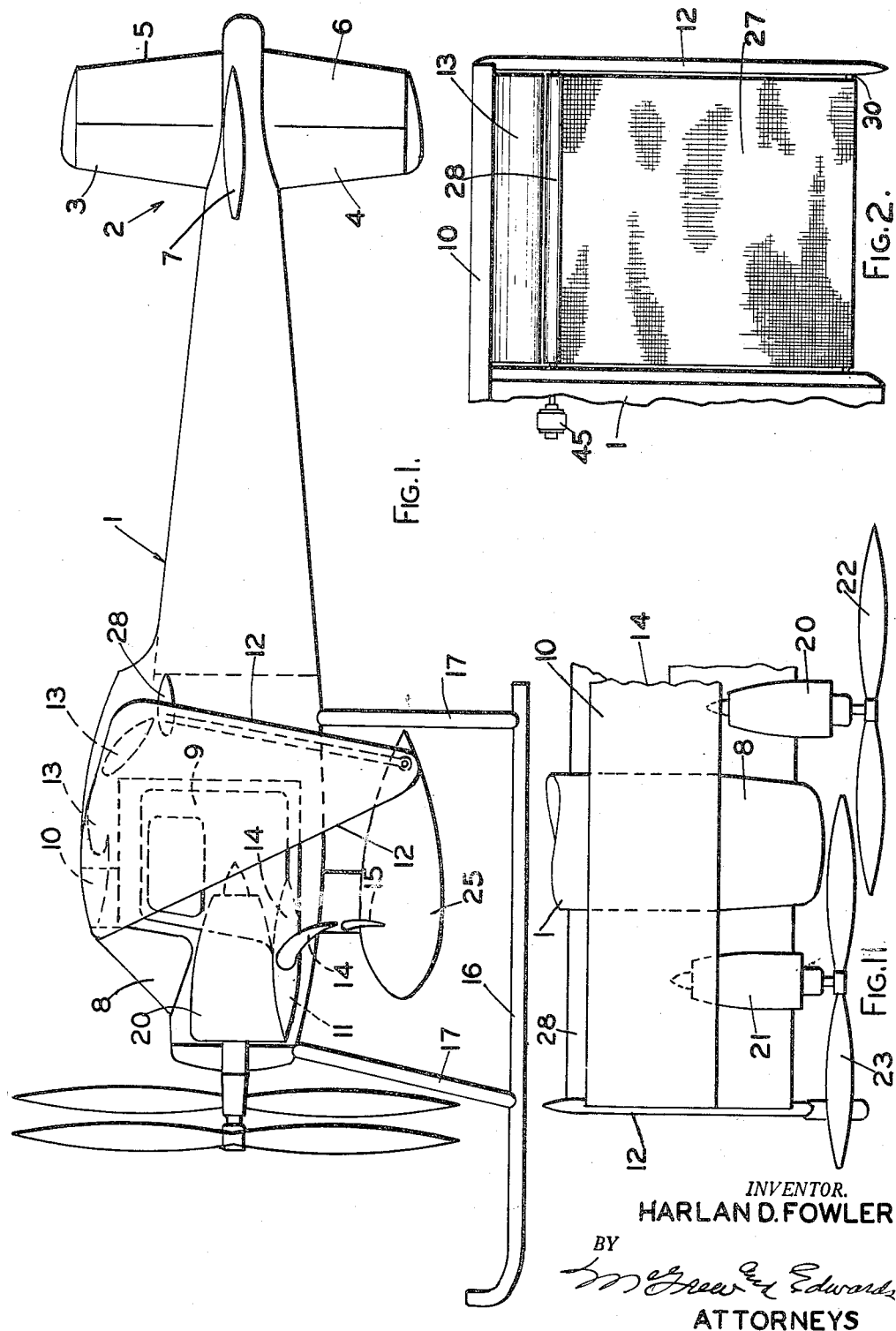

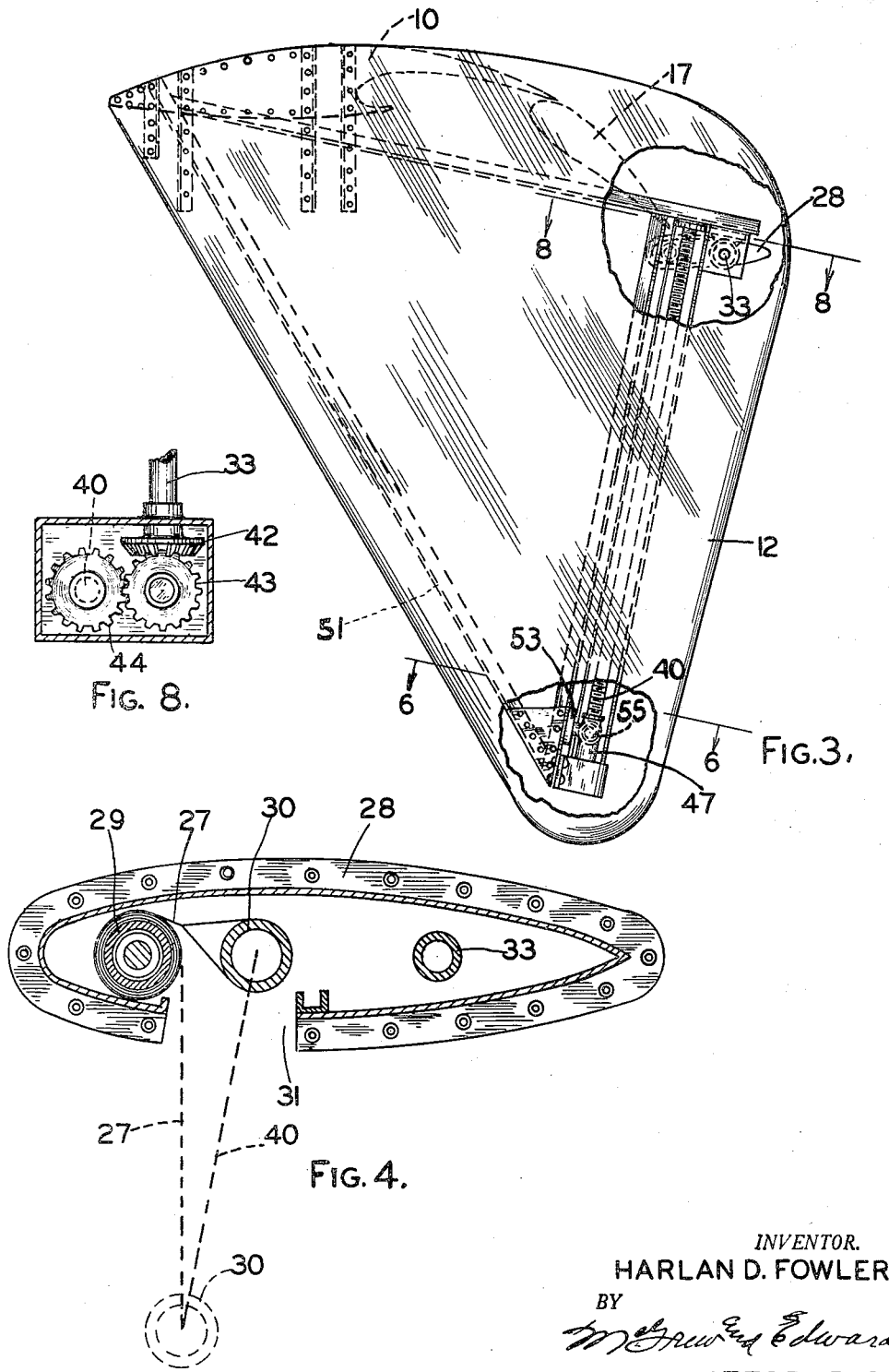

2,950,878

SLIP STREAM DEFLECTOR FOR CONVERTIBLE AIRCRAFT

Harlan D. Fowler, 1006 Corey St., Longmont, Colo.

Filed June 14, 1957, Ser. No. 665,693

14 Claims. (Cl. 244—12)

This invention relates to aircraft having conventional forward-thrust propellers or turbo-jet engines, arranged for high-speed performance, and having means for converting the aircraft into one having the operating characteristics of a helicopter.

Recent experimentation has shown that aircraft utilizing high static thrust conventional propellers may be made to operate with the characteristics both of a helicopter and a high-speed-performance airplane. In one experimental model, the engines of the aircraft were mounted on a tiltable wing so that the engines could be moved from a forwardly-directed position into an upwardly-directed position. In the upwardly-directed position, the thrust of the propellers causes the aircraft to rise or settle vertically, and by turning the wing forwardly, the airplane flies in a conventional manner. In another type using a fixed wing, the slipstream from the propellers of the aircraft is deflected downwardly, as for example by the use of large wing flaps. Another version used the rearward thrust of a turbo-jet on large deflected flaps of a fixed wing. In each instance, the forward thrust is neutralized to prevent or greatly reduce forward motion.

The criterion for achieving a vertical takeoff and landing aircraft, generally described as a VTOL or convertible aircraft, is the turning angle $\theta$. $\theta$ is defined as the inclination of resulting force vector F from the thrust axis of a propeller, or $$\tan^{-1} \frac{L}{Fx}$$

in degrees, where L is the vertical lift and $Fx$ is expressed as thrust T of the propeller minus drag D of the aircraft with extended flaps. Where the drag D is increased to equal the thrust T, $Fx$ is zero, the resultant force F equals L and $\theta$ equals 90°. If $\theta$ is greater than 90°, backward flight is possible.

The lift and drag forces on a good deflected slipstream configuration at zero forward speed are components of the force applied in redirecting the momentum of the slipstream from a horizontal to a near vertical direction. In terms of the momentum theory expressions, the thrust equals $m\Delta V$ where $m$ is the mass flow per second and $\Delta V$ is the velocity imparted by the propeller. The maximum lift that could be developed would be obtained by deflecting the entire mass flow of the slipstream straight down. The change in vertical velocity would then be from zero to $\Delta V$ and the lift would be lift equals $m\Delta V$ or exactly equal to the thrust. If the slipstream is directed straight down, the velocity in the horizontal direction is changed from $\Delta V$ to zero and drag is drag equals $m\Delta V$ or again exactly equal to the thrust. This assumes no losses in the turning process. In practice, it is impossible to avoid some losses from viscous forces and from lateral spreading of the slipstream.

The National Advisory Committee for Aeronautics (NACA), the United States Government organization for aeronautical research, has conducted numerous tests on various models designed to deflect the slipstream from conventionally mounted aircraft propellers. In the majority of the tests where the turning angle $\theta$ approached ninety degrees, the ratio of the lift divided by the static thrust is around 0.80. This means that if the gross weight of the VTOL aircraft is, for example, 3200 pounds, the thrust which would have to be produced by the propeller to obtain vertical takeoff must be 4,000 pounds. As compared to the thrust of conventional type aircraft, this thrust is from two to three times greater, and, therefore, one of the requirements of the VTOL aircraft is the design of large-diameter propellers to achieve high values of static thrust.

Tests conducted by the NACA on a monoplane wing indicate that if the accumulated length of multiple flap chords caused by deflecting them to about 90° to the wing chord and within the slipstream of the propeller approaches about 0.90 propeller diameter, then VTOL may be successfully attained. The structural development and operation of flaps approaching this size imposes a severe design problem.

According to the present invention, applicant reduces the size of these very large chord flaps and utilizes a single, light-weight, high-drag, slipstream deflector, which in one form of the invention, enables a fixed-wing airplane to accomplish vertical takeoff and landing and, also, enables the aircraft to hover airborne over a fixed spot.

It is therefore an important object of the invention to provide means for a fixed-wing airplane to enable it to hover and to take off and land at steep angles and at a low rate of vertical speed.

Another object of the invention is to provide a variable slipstream deflecting device which is arranged to deflect a horizontally-directed propulsion flow of gas generated by a propulsion engine toward a vertically-downward direction.

A further object of the invention is to provide a light, easily-operated variable drag mechanism for directing the slipstream momentum of a propeller into a downward movement.

Still another object of the invention is to provide a mechanism which permits adjustment of this variable slipstream deflector easily and quickly so as to equalize the variable thrust of a conventional propeller to attain a minimum $Fx$ component during landing procedure of the aircraft and/or hovering operations.

Another object of the invention is to provide simplified and easily-operated means for fixed-wing aircraft which will permit forward or backward flight of the aircraft to provide the variable vertical speed at substantially zero horizontal speed.

A still further object of the invention is to provide variable slipstream deflecting means which permits deflection of the slipstream of a conventional propeller for vertical takeoff and landing of an aircraft, and which will retract so as to permit a fixed-wing airplane to achieve high-speed performance as a conventional propeller-driven aircraft.

A still further object of the invention is to provide a fixed-wing conventional propeller-driven aircraft with a thin flexible variable-drag-producing device and slipstream deflector curtain which is quickly and easily extended or retracted, and which is sufficiently strong to withstand the extreme pressures to which it is subjected from the high slipstream momentum of the propellers.

These and other objects and advantages of the invention may be readily ascertained by referring to the following description and appended illustrations in which:

Fig. 1 is a side elevational view of a rearwardly or negative staggered fixed-wing biplane having the variable curtain of the present invention mounted thereon;

Fig. 2 is a partial, front elevational view of a detail of the variable-slipstream deflecting curtain in extended position;

Fig. 3 is an enlarged detail of a wing end plate shown in partial section illustrating the mounting of the variable curtain mechanism of the invention therein;

Fig. 4 is an enlarged sectional view of the variable-slipstream deflecting curtain mounted in its retraction streamline housing strut;

Fig. 5 is a partial, front elevational detail of a variable-slipstream deflecting regulator of the invention, showing an operating mechanism thereof;

Fig. 6 is a cross-sectional view of a wing end plate of the invention taken along section line 6—6 of Figs. 3 and 5;

Fig. 7 is an enlarged detail of a variable slipstream deflecting curtain roller mount according to the invention;

Fig. 8 is an enlarged detail of a driveshaft operating mechanism of the variable-slipstream deflecting curtain according to the invention taken along section line 8—8 of Fig. 3;

Fig. 9 is an enlarged detail, end elevational view taken from section 9—9 of Fig. 7 of a ball-bearing mount for a variable slipstream deflecting curtain roller of the invention;

Fig. 10 is a cross sectional view of a slotted end roller of the invention taken along section line 10—10 of Fig. 7; and Fig. 11 is a partial plan view of the device of the invention illustrating the engine mounts in relation to the wings and the slipstream deflecting regulator means of an aircraft.

In the device as illustrated in the drawings, an airplane includes a fuselage, shown in general by numeral 1, and an empennage assembly, shown in general by numeral 2. The empennage includes an upper vertical stabilizer 3 and a lower vertical stabilizer 4, each having a rudder 5 and 6 respectively. The horizontal stabilizer 7 includes an elevator, not shown, which is of conventional design. A pilot's compartment or cockpit 8 is provided in the nose of the airplane, and a door 9 provides an entry means to the cockpit. The airplane is a rearwardly-staggered biplane including upper wing 10 and a lower wing 11 connected in conventional manner to the fuselage, and having an outboard end plate 12 connecting the two wings together and extending below the lower wing 11. A conventional extendible trailing edge flap 13 is mounted in conventional manner to the upper wing 10, and a plain flap 14 is secured in conventional manner to the lower wing 11. The plain flap 14 extends below the lower wing 11 in extended position and includes a slotted flap 15 which extends therebelow. The flaps 14 and 15 retracts into the wing 11 and the extendible flap 13 retracts into wing 10 according to conventional design.

The aircraft is arranged for vertical takeoff and landing, and a pair of skid bars 16 mounted on struts 17 provides landing gear for the airplane instead of conventional gear. The struts 17 for the landing runners 16 are sufficiently long to maintain the aircraft a considerable distance above the ground level to reduce the ground effect on the wing cellule as well as on the deflected slipstream. Other types of landing gear may obviously be used; however, the gear illustrated is adequate for the VTOL aircraft, and the skid system is light and sufficiently strong to support the aircraft. Power for the aircraft is provided by means of two turboprop engines one mounted on each side of the fuselage. As illustrated in Fig. 11, a left engine 20 is staggered slightly forward of right engine 21 so that propeller 22 mounted on the engine 20 is slightly forward and out of the rotational disc of propeller 23 mounted on engine 21. It will be noted that the propellers are large diameter, high static thrust, propellers which overlap in front of the cockpit, and the combined propeller discs exceed the span of the wings. The engines are supplied with fuel from internal tanks, not shown, and also from an external tank 25.

The variable drag regulator and slipstream deflector for the aircraft is provided by means of a curtain 27 which is mounted on a roller contained in a horizontal strut 28 extending from the fuselage 1 to the end plate 12. The curtain 27 is wound on a roller 29 which is mounted within the streamline strut 28, and the outer end of the curtain 27 is securely fastened to a rod 30 also enclosed by the streamline strut 28. The strut 28 includes a bottom opening 31 through which the rod 30 can pass to a lower position, as for example indicated in the dashed lines. A drive shaft 33 is also mounted within the streamline strut 28 and provides power means for raising and lowering the curtain as will be explained below. The curtain which must be very strong material may be about 1/16-inch, or greater, reinforced rubber, nylon sheet and like fabrics or it may be stainless steel sheet of about 0.010 inch thick, or other sheet material which is capable of being rolled or flexed and of withstanding very large forces to which it is subjected. It is to be noted that when the curtain is fully extended and is deflecting the slipstream of a propeller the supporting portions of the curtain where it is attached to the supporting members 29 and 30 are under large bending stresses, therefore, these members must be sufficiently strong to support these stresses.

The curtain is mounted on the spring-tensioned roller 29, similar to a household curtain rod and the sheet 27 may be secured to this roller as by riveted construction by means of rivets 34, illustrated in Fig. 7. The roller is provided with roller bearings 35 at each end thereof for ease of operation. A stub shaft 36 is attached to a torsion spring 37, mounted internally of the roller 29. A center spring-holding mechanism 38 reduces the overall length of the spring and permits use of two springs instead of the one. A bearing mount 32 slips onto the slotted end of the roller 29 for an initial adjustment and easy assembly, and a pair of studs 38 hold the stub 36 in place. The stub 36 provides means for adjusting the torsion spring to hold the curtain under tension in retracted position as well as in extended position. The tension in partially retracted position must be sufficiently strong to prevent unrolling of the curtain when only part way down and under full pressure of maximum thrust of the propeller, as for example, when maneuvering into position for landing when the curtain is progressively extended under varying loads of the slipstream. In other words, the spring must be sufficiently strong to prevent unrolling of the curtain by the slipstream pressure from the propeller. A pair of nuts 39 mounted on the internal end of the stub shaft 36 securely locks the torsion spring onto the stub shaft which rotates within the bearing mount 32 which, in turn, is in the slotted ends of roller 29; turning stub 36 places the spring locked under tension so that the tube 29 will be under torsion while the curtain is completely wound up thereon.

A jack screw 40 is mounted in the end plate 12 and extends from the bottom thereof to about the height of the strut 28, and a similar jack screw 41 is mounted in the fuselage and it also extends up to about the strut 28. The jack screws 40 and 41 are interconnected with the drive shaft 33 by a gearing arrangement; the details for the connection between the drive shaft and the jack screws is illustrated in Fig. 8. The drive shaft 33 has a beveled gear 42 mounted thereon driving an idler gear 43. The idler gear meshes with the gear 44 which is mounted on the upper end of jack screw 40. A similar arrangement connects the jack screw 41 with the drive shaft 33 at the inner end thereof. A motor 45 is secured to the drive shaft 33 and the motor is controlled by a panel indicated at 46 in Fig. 5. In this instance, the panel illustrates "up," "neutral" and "down" buttons.

A knuckle 47 is mounted on the jack screw 40 and a knuckle 48 is mounted on the jack screw 41, and each of the knuckles are arranged to move up and down as the jack screws are rotated. The rod 30 is mounted on and supported between the knuckles so that it moves up and down with the knuckles, rolling and unrolling the curtain 27. When the rod 30 is moved up the spring tension rewinds the curtain onto the roller 29 and maintains the tension of the curtain between the two members.

Each knuckle is mounted in a track assembly to maintain alignment of the knuckles and jack screws, and the assembly is described with reference on one such assembly but is applicable to all of them. The knuckle 47 mounted on the jack screw 40 includes a forwardly extending shaft 52 on which is mounted a bearing 53. The bearing 53 runs in a track 54 which is mounted in end plate 12. An outwardly extending shaft 55 has a bearing 56 mounted thereon, and the bearing runs in track 57 which is mounted in the end plate 12. The tracks 54 and 57, which may be of one integral shape, provide bracing, along with internal brace 51 for the skin 58 of the end plate 12. The bearings 53 and 56 maintain the jack screw in operative alignment during use of the curtain, and also prevents the forces pulling on the curtain and lateral forces acting on the end plates from entering the jack screw along its entire length.

In operating the device of the invention, the engines of the aircraft are started, and after being warmed up for takeoff, the flaps 13, 14 and 15 are fully lowered. In the lowered position, the flap 13 extends from its retracted position in the wing to the extended position adjacent the streamline strut 28. In the extended position, the flap 13 approximately closes the gap between the wing 10 and the strut 28, thus presenting a large projected frontal area to the slipstream. With the flaps 14 and 15 in extended position downwardly, the throat between the extended curtain and these flaps should be approximately equal to the distance between the two wings so as to have no constriction of the slipstream flow. The motor 45 is then operated to lower the rod 30 and the curtain 27. The engines are then run up to approximately full power, and since the drag equals or exceeds the thrust there will be no forward movement of the aircraft. The thrust of the slipstream which is deflected downwardly raises the aircraft substantially vertically off the ground. When sufficient height has been reached, the curtain is slowly raised, decreasing the drag and an amount of slipstream deflected downwardly permitting the forward thrust to move the aircraft forwardly through the air. As the curtain is raised further into closed position, the aircraft increases forward air speed. The flaps are then slowly retracted and with the aircraft at flying speed it performs as a conventional propeller-driven aircraft. For landing, the same procedure in reverse is used. The aircraft is slowed to permissible flap-let-down speed and the flaps 13, 14 and 15 are fully lowered. To maintain flying speed the engines will have to be increased in power output and the drag curtain is slowly lowered as the power output of the propellers is increased. The drag of the aircraft can be readily varied by means of the motor 45 raising and lowering the curtain and the aircraft can be made to hover or slowly descend or rise as desired.

In the particular design illustrated in the drawings, the curtain when fully extended is equal to about one half of the propeller diameter, and the fully-extended curtain combined with the single-slotted flap covers about two thirds of the propeller diameters. In addition the flaps in the lower wing create lift and drag. Since a biplane is more effective in deflecting the propeller slipstream than a monoplane, this combined deflective length to propeller diameter ratio is equivalent to about 0.8 of the monoplane value. In this case turning angle $\theta$ will be substantially ninety degrees. The slight forward inclination of the curtain is arranged to direct the mass of flow of air toward the front and prevent leakage to the rear with its consequent loss.

The raising and lowering mechanism for the curtain has been described as utilizing a spring-tension roller for maintaining the tension on the curtain as it is raised and lowered; however, other mechanisms may be utilized for maintaining correct tension and to prevent bulging or billowing out of the curtain. For example, the roller for the curtain may be geared to the screw jacks so that only as much curtain will be unrolled as is required by the lowering of the rod. When the curtain is raised, the curtain will be rolled up on the roller a sufficient amount to maintain tension in the curtain as the rod is raised.

The invention has, also, been described with an aircraft utilizing two engines, each having a propeller; however, different types of aircraft may also utilize the concept of the invention for achieving substantially vertical takeoff and landing. For example, a single-engine aircraft utilizing a conventional propeller or counter-rotating propellers may, likewise, take advantage of the invention to deflect the slipstream downwardly and achieve vertical take-off and landing. In this connection, however, it will be noted that the turboprop engines with high velocity exhaust from the engine increases the thrust of the slipstream. Likewise, a high-wing monoplane may readily utilize the variable drag curtain of the invention by providing an outer jack screw and an inner jack screw mounted within end plates as described for the biplane, and with some means of bracing the outer jack for opposing the great pressure to which it would be subjected. Further, as pointed out above, by varying the turning angle, the aircraft may be made to achieve takeoffs and landings ranging in length, including short length and up to vertical takeoffs and landings.

One effective form of the invention utilizes the rearward staggered biplane having the two engines each with a ten-foot diameter propeller. By utilizing an upper wing flap and a lower wing double flaps and an effective curtain of sixty inches height for a variable drag regulator, there is provided sufficient surface to produce the required turning angle of ninety degrees so that the aircraft may achieve a vertical takeoff and landing aircraft. With these dimensions, two fourteen-foot wings for the biplane are sufficient to sustain flight and provide high-speed performance as a conventional aircraft.

While the invention has been illustrated by reference to a specific embodiment, there is no intent to limit the scope or the concept of the invention to the precise details so set forth, except insofar as defined in the following claims.

I claim:

1. In an aircraft having a high wing and a tractor propeller arranged for conventional propeller driven air flight and in which the propeller is arranged for developing a variable high static thrust slipstream, the improvement which comprises means inclusive of a flexible curtain mounted on a roller rearwardly and below said wing and extendible therefrom for projecting an essentially flat surface substantially perpendicular to and in the slipstream of said propeller, said surface being arranged to simultaneously present a variable projected frontal area and to deflect a major portion of the slipstream downwardly and to substantially equalize the thrust to nullify forward movement, said downward slipstream momentum producing lift, for moving the aircraft at controllable vertical airspeeds.

2. In an aircraft having a high wing and a tractor propeller arranged for conventional propeller driven air flight and in which the propeller is arranged for developing a variable high thrust slipstream, the improvement which comprises means inclusive of a flexible curtain mounted on a roller rearwardly and below said wing and extendible therefrom for projecting an essentially flat surface from a zero surface area to at least half of the propeller diameter, said surface extending substantially perpendicular to and in the slipstream of said propeller, said surface being arranged to simultaneously present a variable projected frontal area so as to deflect a major portion of the slipstream downwardly and to substantially equalize the thrust to nullify forward movement, said downward slipstream momentum producing lift for moving the aircraft at controllable vertical speeds.

3. In an aircraft having a high wing and a tractor propeller arranged for conventional propeller driven air flight and in which the propeller is arranged for development of a variable high thrust slipstream, the improvement which comprises means inclusive of a flexible curtain mounted on a roller rearwardly and below said wing and extendible therefrom for projecting an essentially flat surface of variable surface area perpendicular to and in the slipstream of said propeller, said surface being arranged to extend to at least half of the propeller diameter and to deflect the slipstream about ninety degrees downwardly so as to substantially equalize the thrust to nullify forward movement, said downward slipstream momentum producing lift for moving the aircraft at controllable vertical air speeds.

4. In an aircraft having a high wing and a tractor propeller arranged for conventional propeller flight, the improvement which comprises means inclusive of a flexible curtain mounted on a roller rearwardly and below said wing and extendible therefrom for presenting a variable projected frontal area as an essentially flat surface perpendicular to the slipstream from the propeller and arranged adjacent to and rearwardly of the trailing edge of said wing, and means inclusive of wing flaps arranged to be extended downwardly from the trailing edge of the wing substantially filling the gap between the wing and said roller for varying the effective area perpendicular to the slipstream so as to deflect a variable portion of the slipstream downwardly and to substantially equalize the thrust as the thrust is increased and decreased for providing variable vertical speed of the aircraft at low to minimum horizontal speeds.

5. In an aircraft having a fixed wing and a conventional tractor propeller and having a trailing edge flap in said wing, the improvement which comprises adjustable means inclusive of a flexible curtain mounted on a roller rearwardly and below said wing and extendible therefrom for providing a variable projected frontal surface area substantially perpendicular to said wing extending below and forming a continuity with said flap when in extended position, said flap and said surface being arranged to deflect a major portion of the slipstream of said propeller downwardly and substantially perpendicular to said wing, and means for extending and retracting said curtain for varying the surface area of said adjustable means for deflecting a variable amount of the propeller slipstream downwardly to thereby vary the intensity of the lift from said deflected slipstream momentum and provide a variable vertical speed of said aircraft.

6. In an aircraft having at least one fixed wing, a tractor propeller and having an extendible wing flap in the trailing edge of the wing, the improvement which comprises adjustable means inclusive of a flexible curtain mounted on a roller rearwardly and below said wing and extendible therefrom for providing an essentially flat surface extending in and substantially perpendicular to the slipstream from the propeller and forming a continuity with the flap when it is fully extended, the combined length of the extended flap and the fully extended curtain approaching the diameter of the propeller, the flap and the surface providing an essentially continuous surface for deflecting a major portion of the slipstream downwardly so as to create a variable vertical lift.

7. In an aircraft having a high-mounted fixed wing, a tractor propeller and having a wing flap in the trailing edge of the wing, the improvement which comprises means inclusive of a flexible curtain mounted on a roller rearwardly and below said wing and extendible therefrom for providing an essentially flat surface area variably extending in and substantially perpendicular to the slipstream from the propeller and forming a continuity with the flap when both are fully extended, the combined length of the extended flap and the extended curtain approaching the area of the propeller, the flap and the surface providing an essentially continuous surface extending downwardly from the trailing edge of the wing for deflecting a major portion of the slipstream downwardly so as to create a variable drag to substantially equalize the thrust and thereby reducing forward movement of the aircraft and providing a controllable, variable, vertical air speed.

8. In an aircraft inclusive of a fuselage and having a high-thrust tractor propeller and a fixed wing having an extendible flap at the trailing edge thereof and end plates attached to said wing and extending downwardly therefrom, the improvement which comprises a streamline strut mounted on each side of said fuselage substantially parallel to the wing and below and rearwardly thereof in a position adjacent to the lower edge of the flap when fully extended, said struts being supported at their outer ends by said end plates, a roller enclosed in said strut, a thin, flexible curtain mounted on said roller and arranged to wind on and unwind therefrom, a rod attached to the outer edge of said curtain, and means mounted on said fuselage and said end plates interconnected with said rods for moving simultaneously each said rod substantially perpendicular to the slipstream of the propeller and thereby move the curtain into and out of the slipstream for deflecting the slipstream downwardly.

9. The improvement in an aircraft according to claim 7 in which the combined length of the fully extended curtain and flap is equal to at least about two-thirds of the propeller diameter.

10. In a rearward staggered biplane having at least one traction propeller and extendible trailing edge flaps on each wing, the improvement which comprises a retractable and extendible curtain mounted rearwardly and adjacent to the trailing edge of the extended flaps of the upper wing of the biplane and arranged to extend generally perpendicularly downwardly from the flaps, there being a horizontal gap between the trailing edge of the lower wing flap when fully extended and the fully-extended curtain substantially equal to the vertical gap between the upper and lower wings, and actuating means independent of said flaps for extending and retracting the curtain and simultaneously maintaining the curtain taut so as to deflect the slipstream of the propeller downwardly.

11. In a biplane according to claim 10, the improvement which includes a curtain having an area of substantially half the area of the disc circumscribed by the propeller when fully extended so as to deflect downwardly the slipstream so that the thrust of the propeller is upwardly and thereby provide a variable vertical speed at substantially zero horizontal speed.

12. In a rearward staggered biplane having two traction propellers and trailing edge flap in each wing thereof, the improvement which comprises a retractable and extendible curtain mounted rearwardly in a strut positioned adjacent to the trailing edge of the upper wing flap in extended position and with the flaps providing an essentially continuous surface and extending perpendicularly downward from the upper wing, there being a horizontal gap between the extended flap of the lower wing and the fully-extended curtain substantially equal to the vertical gap between the upper and lower wings, and means interconnected to the free end of said curtain moving toward and away from the strut for variably extending and retracting the curtain and maintaining the curtain taut to deflect a portion of the slipstream momentum substantially vertically downwardly.

13. A biplane according to claim 12 in which the means for extending and retracting the curtain includes a spring load roller mounted in said strut on which the curtain is wound and unwound, a motorized jack screw system interconnected with the free end of said curtain for raising and lowering said curtain.

14. A structure arranged for attachment to an aircraft having a fixed upper wing to provide an extending surface below the trailing edge of said upper wing and the trailing edge of a fully extended trailing edge wing flap, comprising a strut transversely mounted on the aircraft and extending generally parallel to the wing and provided with end plates mounted on said wing and extending downwardly and below said strut, a roller mounted in said strut, a slipstream resistant curtain wound on said roller, a rod secured to the free end of said curtain, a jack screw mounted at each side of said curtain and the outer screws enclosed by said end plates, means interconnecting said rod with each said jack screws for reciprocal movement along the rods, means for driving said jack screws for moving said rod downwardly and upwardly to extend and retract said curtain, and means retarding vertical movement of the rod for maintaining said curtain taut and in position to downwardly deflect a portion of a slipstream.

References Cited in the file of this patent

UNITED STATES PATENTS

| | | |
|---|---|---|
| 1,890,059 | Lake | Dec. 6, 1932 |
| 1,910,098 | Ellis | May 23, 1933 |
| 2,115,285 | Ruderman | Apr. 26, 1938 |
| 2,761,634 | Velazquez | Sept. 4, 1956 |